UNITED STATES PATENT OFFICE.

JOHN BAYNES, OF UNIONPORT, NEW YORK.

TILE.

SPECIFICATION forming part of Letters Patent No. 369,090, dated August 30, 1887.

Application filed October 26, 1886. Serial No. 217,269. (No specimens.)

*To all whom it may concern:*

Be it known that I, JOHN BAYNES, a subject of the Queen of Great Britain, residing at Unionport, in the county of Westchester and State of New York, have invented certain new and useful Improvements in Tiles, of which the following is a specification.

My invention relates to an improvement in tiles in which the surface of ordinary tile that has been glazed by processes now in use is treated with a mixture of hydrofluoric acid and carbonate of ammonia and the glaze partially removed and dulled.

Common tile is glazed in furnaces by the use of substances known in the art. This is done to give the surface a more finished appearance; but it has been found that after it is thus highly glazed or enameled it presents a cheap and tawdry appearance, similar to ordinary glazed pottery. There have been many unsuccessful attempts to soften or dull this effect, principally made upon the tile while it was still in the furnace. I have discovered, however, that if the tile, after it comes glazed from the furnace, be dipped into a mixture of hydrofluoric acid and carbonate of ammonia this glaze will be partially eaten away, and the surface will have the smooth but dull non-polished and non-reflecting character so much desired. The action of this compound has the appearance of being not merely confined to the silicious or vitreous portion of the glaze, but the coloring also is softened until it resembles somewhat the bloom upon fruit, especially in the depressed portions of a tile having an irregular surface. After it is so treated the tile has a smooth but not glossy surface, with a resemblance to carved stone or delicately-cut cameo. When placed side by side with the glazed tile, its superiority as an article of manufacture and decoration can be readily observed. The former with its glassy surface resembles glazed pottery, the latter possessing the very attributes that should render tile a good substitute for stone.

The exact proportions of hydrofluoric acid and carbonate of ammonia to be used to produce a mixture that shall accomplish this result will depend somewhat upon the quality of the glaze; but I have found the following formula to be useful: three-fourths ounce of carbonate of ammonia, one pound of hydrofluoric acid, and three pounds of water. The length of time during which the tile should remain in the mixture is about six minutes, although a longer or shorter interval can be allowed to produce any desired effect.

The composition is not strictly confined to hydrofluoric acid and ammonia, but any equivalent acid may be used.

I know that before my invention hydrofluoric acid has been used in etching upon glass and for eroding other surfaces. I do not therefore claim such, broadly; but What I do claim as my invention, and desire to secure by Letters Patent, is—

As a new article of manufacture, a tile having its surface coated with a dulled glaze, substantially in the manner and for the purpose set forth.

In testimony whereof I affix my signature, in presence of two witnesses, this 23d day of October, 1866.

JOHN BAYNES.

Witnesses:
THOMAS HUNT,
HENRY E. EVERDING.